B. GMÜR.
SPEED CHANGING MECHANISM.
APPLICATION FILED JULY 8, 1907.

No. 912,559.

Patented Feb. 16, 1909.

2 SHEETS—SHEET 1.

Witnesses:
Jesse N. Lutton
B. Sommers

Inventor:
Berthold Gmür
by Henry Orth Jr.
Atty.

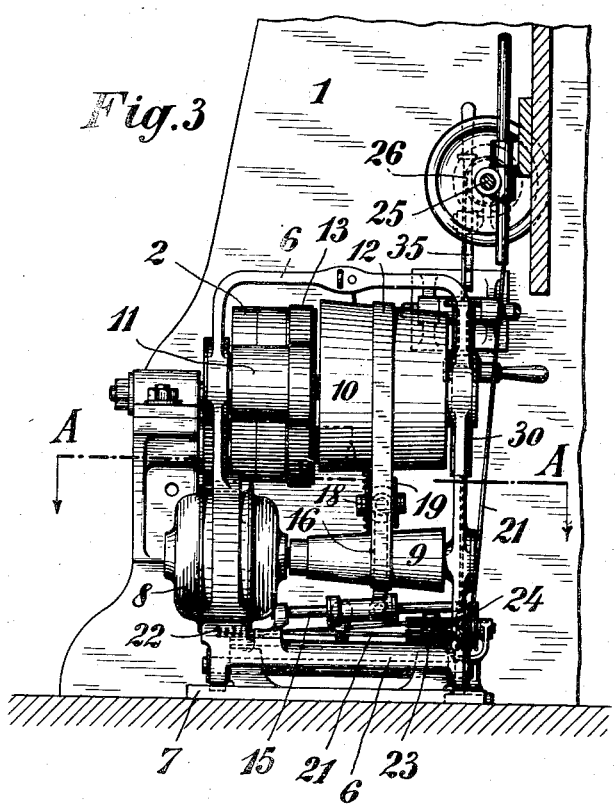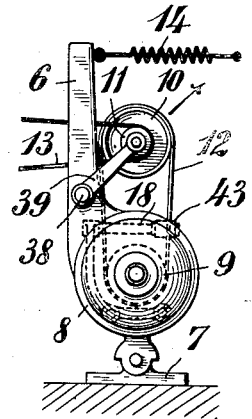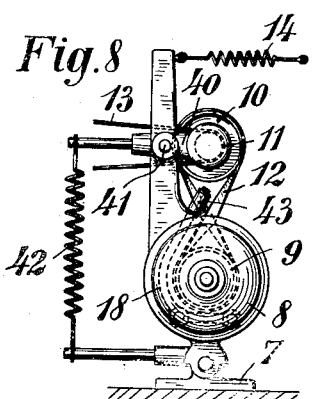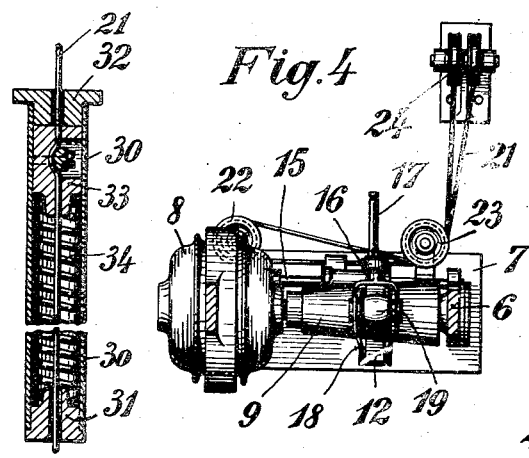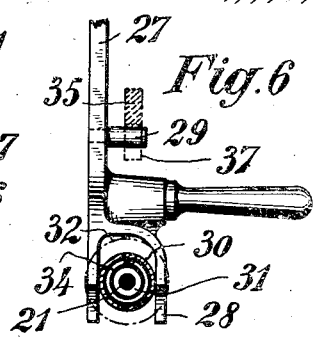

UNITED STATES PATENT OFFICE.

BERTHOLD GMÜR, OF SCHÄNIS, SWITZERLAND.

SPEED-CHANGING MECHANISM.

No. 912,559.　　　Specification of Letters Patent.　　Patented Feb. 16, 1909.

Application filed July 8, 1907. Serial No. 382,710.

*To all whom it may concern:*

Be it known that I, BERTHOLD GMÜR, a citizen of the Republic of Switzerland, residing at Schänis, in the Canton of St. Gall, Switzerland, have invented certain new and useful Improvements in Speed-Changing Mechanism; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

Gearing having two smooth cone pulleys with a belt or the like passing over them, which, for the purpose of changing the speed of revolution of the driven shaft, can be shifted in the axial direction of the pulleys, a tension-device for the belt being provided, is well known. Such gearings, have the disadvantage, however, that in order to attain certain and regular transmission, definite proportions must be maintained, lying between certain limits. Thus, for instance, the two cone pulleys must be of approximately the same diameter, and between the two axes there must be maintained a sufficiently great distance. The belts in these prior devices are tightened by hand or by positive means, and without reference to alterations in length caused, for instance, by changes in the degree of moisture and in the temperature of the air; and further without reference to unequal stretching of the belts, which results with variable tension, so that the transmission of motion is not uniform, and it is difficult to keep the belts taut unless the distance between the axes of the pulleys is considerable and the latter are of about the same middle diameter.

According to my invention permanently regular transmission of motion is insured by the binder pulley of the tightening-device automatically compensating any changes in the length of the belt.

Several forms of construction of the invention are illustrated in the accompanying drawings.

Figure 1:
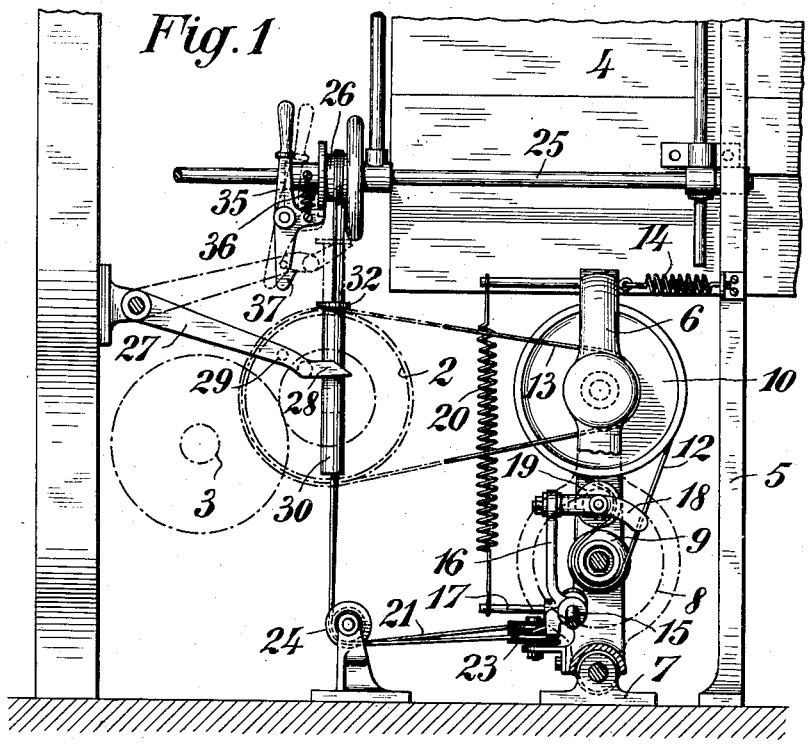
Figure 2:
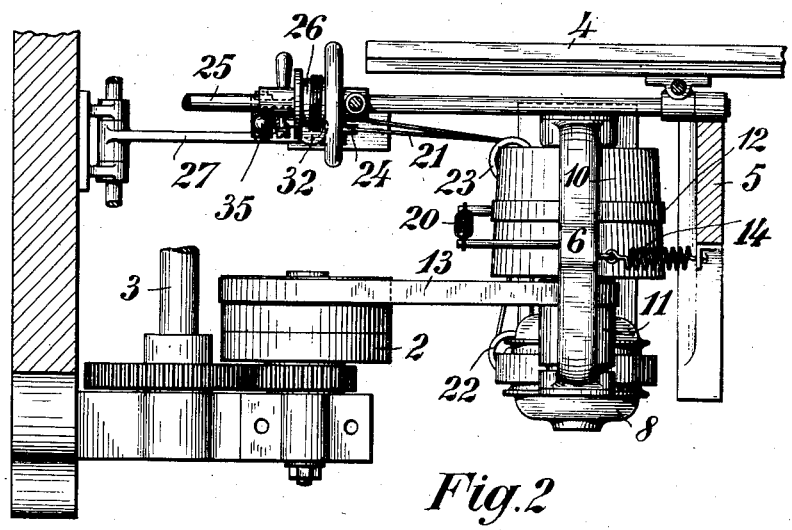

Figure 1 is an elevation of the first form, employed in driving an embroidering machine, only a portion of which is shown. Fig. 2 is a plan of Fig. 1. Fig. 3 is a side elevation of Fig. 1. Fig. 4 is a section on the line A—A of Fig. 3. Figs. 5 and 6 show, on a larger scale, in section and plan, details of parts to be hereinafter referred to. Fig. 7 illustrates a second form of the device, and Fig. 8 a third form thereof.

Referring more particularly to Figs. 1-6, 1 designates one of the standards of a shuttle embroidering machine, 2 a countershaft pulley, connected by gears with the main shaft 3 of the machine, and 4 a pattern-board secured to an upright 5. Between the upright 5 and the pulley 2 there is mounted a rectangular rocking frame 6, turning on the base-plate 7. This frame carries an electric motor 8, on whose shaft, which revolves at constant speed, there is mounted a cone belt pulley 9. Above the motor shaft there is mounted parallel therewith in the frame 6 a second shaft carrying another cone belt pulley 10, adjacent to which a cylindrical belt pulley 11 is also secured on the shaft. The two pulleys 9, 10 are mounted the reverse way to each other on their shafts, and the pulley 10 is of approximately three times the middle-diameter of the pulley 9. The pulleys are connected by an endless belt 12, which passes over them, while a similar belt 13 connects the pulley 11 with the pulley 2. The frame 6 is held on the one side by the belt 13 and on the other side by a spring 14, which draws it toward the upright 5 and thus causes tightening of the belt 13 (Figs. 1 and 2).

On a spindle 15, directed similarly to the facing generatrixes of the two pulleys 9, 10 (though it might be directed parallel to the axes of the two pulleys), there is mounted a bell-crank lever 16, 17 having an elongated hub which slides on the spindle. In the upper end of arm 16 of said bell-crank lever is swiveled a fork 18 in which is journaled a flanged binder-pulley or idler 19. The latter is pressed against one side of the belt 12 by a spring 20, secured to the top of the frame 6, and drawing upon the arm 17 of the bell-crank lever; while the other half of the belt is located between the outer ends of the fork 18, which projects beyond the axis of the idler 19. The belt 12 is thus guided between the fork-shanks and the idler-flanges (Figs. 1 and 4). With the hub of the lever 16, 17 there is connected an endless rope 21 (*e. g.* a thin wire rope), which passes over guide-pulleys 22, 23, 24, to a drum 26, provided with a handwheel and turning on a spindle 25 of the embroidering machine. The rope is passed several times round the drum to prevent independent movement. The portion of the rope 21 lying between the pulleys 22, 23 and connected with the lever 16, 17 lies parallel to the rod 15 (Fig. 3). The operator can reach the hand-wheel of the drum 26 from his place before the pattern-board 4 and by rotating the wheel, can with the aid of the rope 21 and belt-fork 18, shift the belt 12 forward or backward on the pulleys 9, 10, and thus cause the main shaft 3 of the machine to make the desired number of revolutions. The idler 19, under the influence of the spring 20, will always be pressed against the belt 12, and thus keep it taut. Since the arcs of the pulleys 9, 10 which are embraced by the belt 12 are at the same time increased, slipping of the belt is prevented and uniform transmission of motion insured. This regulation of the number of revolutions of the shaft 3 is effected during the ordinary embroidering procedure, by the so-called "festoon-lever" 27, which is pivotally secured to the standard 1, occupying the full-line position shown in Fig. 1. The office of this lever, as is well known, is, on its operation by hand, to throw into operation mechanisms other than those required for ordinary embroidering, whereby so-called "festooning" is performed, during which work the shaft 3 must rotate at the lowest speed. In order, that the lever 27 on being actuated may also effect shifting of the belt 12 on the pulleys 9, 10, so that the speed necessary for festooning may be obtained, the following arrangement is adopted. The front end of the lever 27 has a forked extension 28, projecting beyond its lateral handle, and has also a laterally protruding pin 29 (Fig. 6). The fork 28 embraces a sleeve 30, which incloses the vertical length of rope 21 extending from the one pulley 24 to the drum 26. This sleeve is provided with end-pieces 31, 32 to afford it guidance on the rope, the top piece 32 being, moreover, flanged. Within the sleeve is a piston 33, which is secured to the rope 21 and serves as a stop. Between the piston 33 and bottom piece 31 is a spiral spring 34, which tends to keep the sleeve in such position that the head 32 bears upon the piston 33 (Fig. 5). On the spindle 25, and adjacent to the drum 26, there is secured an arm, on which is mounted a three-armed lever 35, one arm of which is drawn against the flange of the drum 26 by a spring 36. The downwardly directed lever-arm presents a hook 37, which projects into the path of the pin 29 of the lever 27. When the lever 27 is turned upward into the dotted-line position in Fig. 1, for the purpose of starting festooning, the fork 28 will draw the sleeve 30 upward, the spring 34 being compressed, and finally the rope 21 will follow through the action of the spring. The belt 12 will thus be pushed by the fork 18 toward the one end (in Fig. 3 the left end) of the pulleys 9, 10, and the slowest speed transmitted to the shaft 3. The lever 27 and sleeve 30 are maintained in their uppermost position by the pin 29 of said lever snapping into the hook 37 of the lever 35, in which it is retained by the action of the spring 36. The spring 34 acts as buffer, so that on sudden operation of the lever 27, the rope 21 may not be jerked up with it, but is caused gradually to ascend.

Instead of the idler 19, another belt tightening-device may be employed, which, however, with an open belt should be capable of more tightly drawing the latter, as the arcs of the cone pulleys embraced by the belt are smaller with these devices. Figs. 7 and 8 illustrate two such driving-devices with cone pulleys, provided with tightening-appliances of other descriptions. In each construction the two superposed cone pulleys 9, 10 are, as before, mounted in a rocking frame 6, turning on a base-plate 7. The frame is held in vertical position by the action of a spring 14 on the one side, and on the other side by the belt 13 passed round the pulley 11. The lower smaller cone pulley 9 is secured on the shaft of an electric motor 8, mounted in the frame 6, while 18 is a fork for shifting the belt on the cone-pulleys. In the construction shown in Fig. 7, the shaft carrying the upper cone pulley 10 and the belt pulley 11 is mounted on levers 39 (merely diagrammatically indicated in the drawing) turning at 38 on the frame 6, and the belt 12 is tightened by the pull of the spring 14, which in endeavoring to rock the frame 6 on its fulcrum, causes the lever 39 with cone pulley 10 and belt pulley 11 to move in the direction of the arrow, whereby in addition to the belt 12, the belt 13 is also tightened. In the construction illustrated in Fig. 8, the shaft carrying the cone pulley 10 and the pulley 11 is mounted on arms 40 which turn at 41 on the frame 6 and are drawn upon by a spring 42, which has the tendency to turn the arms with cone pulley 10 and pulley 11 upward, and thus tighten the belt 12. The latter is crossed over the cone pulleys 9, 10, though it might be an open belt, in which case a belt fork of the kind shown in Fig. 7 would be employed. In similar manner, the belt 12 in Fig. 7 might be crossed as shown in Fig. 8.

The belt forks 18 of the two last-described constructions may slide parallel with the axes of the two cone pulleys, or parallel with the facing generatrixes of the same, and they may be shifted, for instance, by means of a rope in the manner illustrated in Figs. 1–4. To prevent injury to the belt, the one or both arms of the belt fork may be furnished with a pulley 43, to engage the belt.

Thus with all the above forms of construction of the new driving-gear with cone pulleys, by the provision of a tightening-device for the belt, regular and certain transmission of motion is insured, even although the two cone pulleys may be arranged at the smallest distance apart. The entire apparatus, therefore, can be fixed in a very limited space.

The draw-springs 14, 20, 42, might be replaced by pressing-springs, or by weights, or magnetic influence might be made use of.

Having now particularly described and ascertained the nature of my said invention and in what manner the same is to be performed, I declare that what I claim is:

1. In a speed changing mechanism the combination with two cone pulleys and a belt connecting the same, of a rockable frame supporting the pulleys, means on the frame for shifting the belt, and automatically operated means for maintaining the belt in a taut condition.

2. In a speed changing mechanism, the combination with two cone pulleys and a belt connecting the same, of a belt-shifting device movable longitudinally of the pulleys, and a single tension member carried by the shifting device automatically positionable to the incline of the belt.

3. In a speed changing mechanism, the combination with two cone pulleys and a belt connecting the same, of a swiveled belt-shifting device movable longitudinally of the pulleys and a tension member journaled in said device whose axis is capable of being positioned at an angle to the axes of the pulleys.

4. In combination, a rocking frame, pulleys supported thereby, a belt connecting two of said pulleys, a pulley journaled independently of the frame, a belt connecting the last named pulley with one of the pulleys of the frame, means to rock the frame away from the independently journaled pulley, and means to tension the first named belt.

5. In a speed changing mechanism, the combination with two smooth cone pulleys and a belt connecting the same, of a shaft mounted substantially parallel to the facing generatrixes of the cone pulleys, a belt-shifting member slidably mounted on the shaft, a flanged idler carried by the belt shifting member whose axis is capable of being positioned at an inclination to the axes of the pulleys, and means to automatically press the idler against the belt.

6. In a speed changing mechanism the combination with two cone pulleys and a belt connecting the pulleys, of a fork for shifting the belt, an idler carried by the fork, means for automatically resiliently pressing the idler against the belt, a rotary drum, a flexible member connecting the fork and drum, and a stop resiliently connected with the flexible member, in combination with a machine operating lever adapted to engage the stop.

7. In a speed changing mechanism, the combination with two cone pulleys and a belt connecting the same, of a fork for shifting the belt, an idler carried by the fork, means for resiliently holding the idler in contact with the belt, a rotary drum, an endless connecting member connecting the fork and drum, a sleeve surrounding the connecting member, a spring in said sleeve having one end connected to the sleeve and its other end connected with the connecting member, in combination with a machine operating lever adapted to raise the sleeve, and thereby move the connecting member and means to automatically lock the lever in its raised position.

8. In a speed changing mechanism, a rockable frame, a motor mounted thereon, a cone pulley carried by the motor shaft, a cone pulley journaled in the frame above said motor shaft, a belt connecting the pulleys, a support on the frame longitudinally of the pulleys, a bell crank lever slidable on the support, a fork on one arm of the bell crank lever inclosing the running on and running off portions of the belt, an idler journaled in the fork in engagement with one portion of the belt, and a spring connected to the other arm of the bell crank lever to hold the idler in position.

9. In a speed changing mechanism, a pivoted frame, a motor mounted thereon, a cone pulley carried by the motor shaft, a cone pulley journaled in the frame above the aforesaid pulley, a belt connecting the pulleys, a support on the frame substantially parallel to the facing generatrixes of the pulleys, a bell-crank lever slidable on the support, a fork swiveled in one arm of the bell-crank lever inclosing the running on and running off portions of the belt, a flanged roller journaled in the fork engaging one portion of the belt, a spring bearing on the other arm of the bell crank lever, a drum, a flexible member connecting the drum and bell crank lever, pulleys for guiding the flexible member, a sleeve surrounding the flexible member, a slide in the sleeve connected to the latter, a stop in the sleeve, a spring between the slide and stop, in combination with a machine operating lever, a fork on the latter to engage the sleeve and thereby move the flexible member, and means to automatically lock the lever when raised.

10. In a speed changing mechanism, the combination with two conical pulleys, and a belt connecting the same, of means to automatically tension the belt comprising a roll mounted between the pulleys whose axis is capable of being positioned at an inclination to the axes of said pulleys.

In testimony that I claim the foregoing as my invention, I have signed my name in presence of two subscribing witnesses.

BERTHOLD GMÜR.

Witnesses:
ERNST FISCHER,
A. LIEBERKNECHT.